Patented Oct. 6, 1936

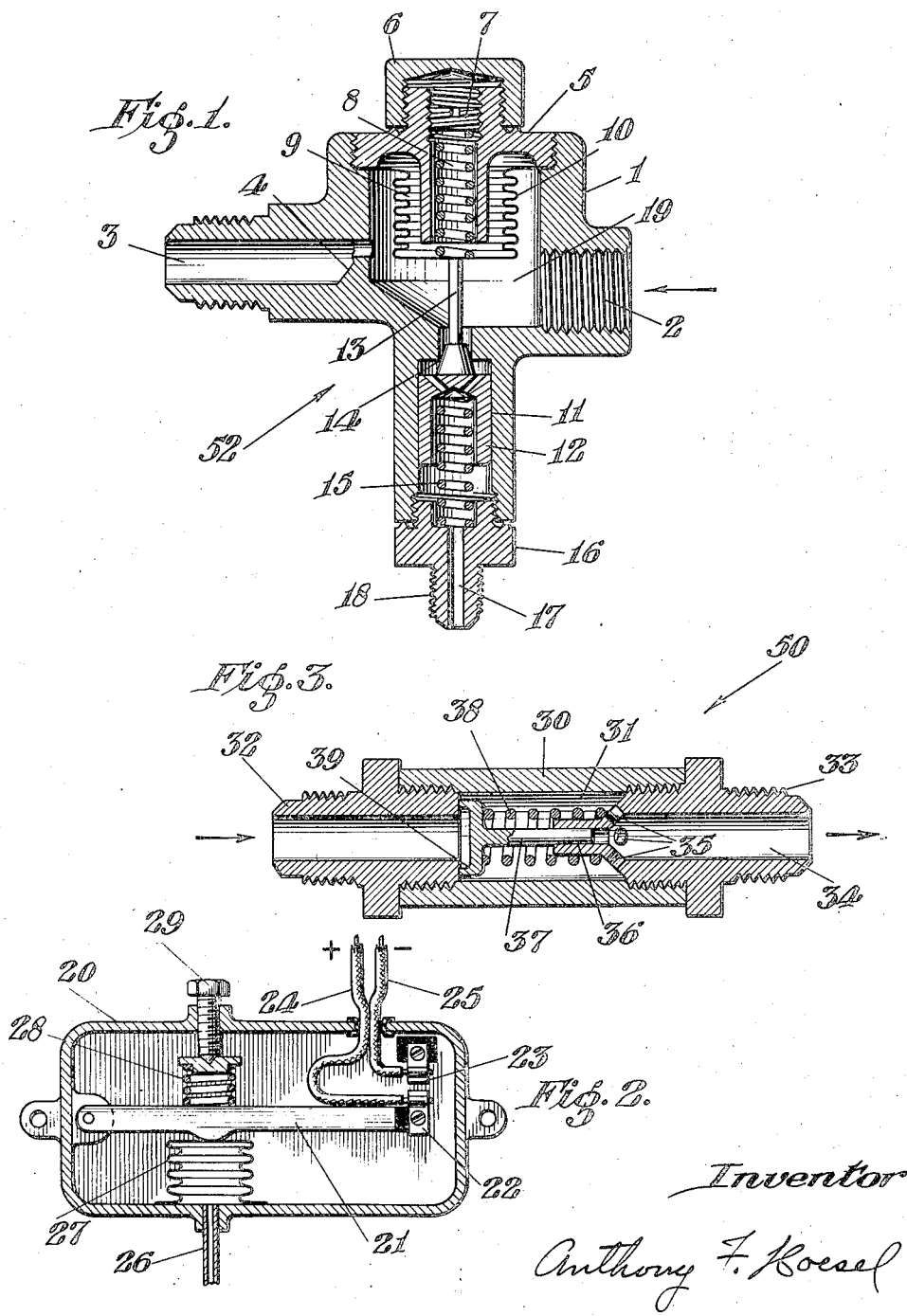

2,056,401

UNITED STATES PATENT OFFICE 2,056,401

REFRIGERATING SYSTEM

Anthony F. Hoesel, Chicago, Ill.

Application September 11, 1935, Serial No. 40,051

6 Claims. (Cl. 62—8)

One of the objects of the invention is to provide means to economically maintain different temperatures in different compartments of a multiple refrigerating system.

Another object of the invention is to facilitate the defrosting of cooling units, during their inoperative period.

A further object of the invention is to provide a simple control means for the accomplishment of the aforesaid objects of the invention.

The maintenance of different temperatures in different compartments of a multiple refrigerating system is quite common practice and is generally accomplished by the use of one of the following systems; the disadvantages of each being stated at the conclusion of their description.

First, operating the entire system of cooling units at a temperature low enough to accomplish the desired low temperature in the lowest temperature compartment, and proportioning the effective heat absorption surfaces, of the various cooling units, to their respective compartment heat loads, so as to maintain the desired temperatures in the respective compartments. This method necessitates an exact knowledge of the capacity of the cooling units as well as the heat load of the compartments. Since the heat load in any compartment may vary at various times, it is evident that, the condition of the heat load being variable, the compartment temperature will also be variable thereto. A further disadvantage is due to the cooling units, in the high temperature compartments, being carried at the common low temperature, the frost tends to progressively accumulate upon the cooling unit surfaces, instead of defrosting during each off-time cycle. Another disadvantage is due to the compressor, during all on-time cycles, operating at the low suction pressure necessary for the low temperature compartment, the overall efficiency of the system is reduced, and the cost of operation increased.

Second, operating the entire system of cooling units as in the previous system, except that the cooling units have separate control means, such as thermostatically operated solenoid valves, which control the rate of refrigerant circulation in the respective cooling units, thereby maintaining the desired temperatures in the various compartments. The disadvantages of this system are the increased cost of the necessary thermostats, solenoid valves and the wiring for the same, plus all the other disadvantages of the first system, with the exception of the variable temperatures in the compartments.

Third, operating the suction line of the system at the necessary low pressure to maintain the desired temperature of the low temperature compartment and placing pressure reducing valves at the outlets of the cooling units in the higher temperature compartments, thereby maintaining a higher refrigerant pressure and consequent temperature in the cooling units equipped with such pressure reducing valves. While these higher temperature cooling units will more readily defrost than those of the two previous systems, there still remains the disadvantage of low overall efficiency and increased operating costs due to the low pressure operation of the refrigerant compressor.

Fourth, operating the higher temperature cooling units at an equivalent higher pressure, which exhausts into a common suction line. In this system the higher temperature cooling units are equipped, at their outlet, with a snap action pressure operated valve, which is adjusted to open the cooling unit outlet at a given high pressure in the cooling unit, and to close the cooling unit outlet at a given low pressure in the cooling unit, thereby maintaining the temperature of the cooling units between certain high and low limits, which substantially maintain the compartments at their desired temperatures. Whenever the snap action valves of the higher temperature and consequent higher pressure cooling units are closed, the compressor readily exhausts the common suction line to the pressure, equivalent to the temperature of the low temperature cooling unit, where the low temperature cooling units start exhausting refrigerant vapor to the common suction line.

In this system, the maximum efficiency of operation is attained; however, one disadvantage remains, and it is this: whenever the snap action valve, of a particular cooling unit, closes, the cooling unit contains liquid refrigerant having a potential capacity for heat absorption. This capacity in B. t. u's. is the sum of the specific heat of the liquid × its amount in weight × the temperature difference between the high and low pressures at which the snap action valves operate, plus the difference of the latent heat of evaporation between the low temperature pressure vapor and the high temperature pressure vapor occupying the available space in the cooling unit during the time the snap action valve is closed. This potential heat absorption capacity, of the refrigerant within the cooling unit, tends to delay the complete defrosting of the higher temperature cooling unit surfaces. Therefore, if complete defrosting must be attained, the snap action valves must be set to open at a higher pressure than if the cooling units were entirely empty of refrigerant liquid. In other words, the refrigerant circulation off-time cycle must be increased, which tends to allow the compartment temperature to rise to a higher point, than may be desired, before the refrigerant circulation cycle is again started.

In these various systems, it is quite common practice to install check valves at the outlets of the lower temperature cooling units to prevent condensation, therein, of the higher refrigerant vapor pressure of the higher temperature cooling units. Even if, as in systems 1, 2 and 3, the common suction line is operated at a low pressure, during which operation no condensation occurs within the low temperature cooling units, the higher temperature cooling units, during the off-time cycle, tend to exhaust into the common suction line, at a higher pressure, than is equivalent to the temperature-pressure of the low temperature cooling units. Unless means are employed to prevent this higher pressure vapor entering the lower temperature cooling units, the lower temperature cooling units absorb the latent heat of condensation and their respective compartments rapidly rise in temperature; also the condensation within the low temperature cooling units increases the normal amount of refrigerant liquid contained by them, and at the start of the on-time cycle, unvaporized refrigerant is returned to the compressor, forming so called frost-backs, which decrease the efficiency of the system and tend to pass the oil from the compressor crankcase to the condenser.

Referring to the drawings:

Figure 1 is an elevational cross-sectional view of a pressure operated bleeder valve used in the invention.

Figure 2 is an elevational view of a pressure controlled make and break circuit switch.

Figure 3 is a cross-sectional view of a check valve used in certain forms of the invention.

Figure 4:
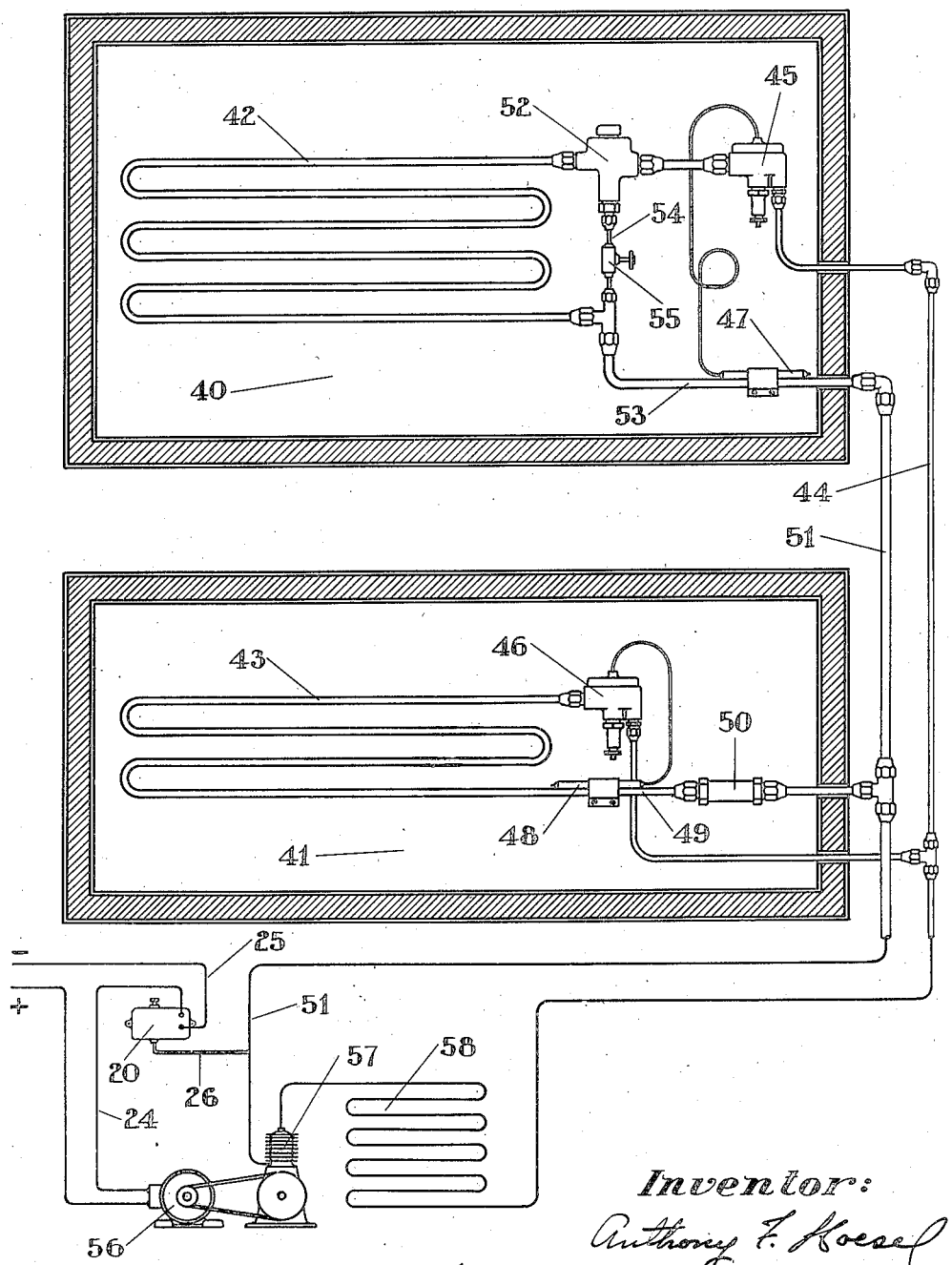
Figure 4 is a diagrammatic layout of a refrigeration system embodying the invention.

In Figure 1, the body casing 1 has an inlet 2 communicating with an outlet 3, which has a dam 4. A cap 5 screws into the body 1 and has an upper threaded portion engaging a screw threaded cover 6. The center of the cap 5 engages an adjusting screw 7 used to vary the length and pressure of a compression spring 8, which plays in the bore of the bellows abutment 9 integral with the cap 5. The bellows 10 is clamped, at its upper end, between the cap 5 and the body casing 1, providing a leak proof joint between the inside and outside of the bellows 10. The lower portion of the body casing 1 has a bore 11 in which a valve 12, having an extension 13 engaging the bottom of bellows 10, is placed. The valve 12 and body casing 1 have engaging seats as indicated at 14. A spring 15 tends to engage the valve seats in opposition to the force of spring 8 contained within the bellows 10. The bore 11, threaded at its open end, engages a spring support fitting 16, which has a bore 17 therethrough and a threaded portion 18 for engaging a flared conduit fitting.

It will be noted that whenever liquid enters the inlet 2, it must fill up the chamber 19, of the body casing 1, to the upper edge of the dam 4, before spilling into the outlet 3.

In Figure 2, a housing 20 contains a contact lever 21, pivotally mounted therein, and carrying an insulated contact 22 for making and breaking an electrical contact between itself and the stationary insulated contact 23 mounted in the housing 20. Electrical circuit leads 24 and 25 engage contacts 22 and 23 respectively. A conduit 26 leads to a bellows 27 positioned within the housing 20. The upper portion of the bellows engages the contact lever 21 and pressure within the bellows 27 tends to move the contact 22 into engagement with contact 23. The movement of the lever 21 is restrained by the spring 28, the pressure of which is adjustable by means of the screw 29 in threaded engagement with the housing 20.

In Figure 3, a spacer 30 having a bore 31 threaded at each end engages an inlet connection 32 and an outlet connection 33. The outlet connection 33 has a bore 34 open to the bore 31, of the spacer 30, by means of holes 35. A guide bore 36, in the outlet connection 33, engages a check valve 37, which, by means of spring 38, is urged into seated relationship with the seat portion 39 of the inlet connection 32. It will be noted that this construction allows only one way passage of fluid through the assembly and in the direction as indicated.

In Figure 4, a compartment 40 is desired to be maintained at a certain temperature and a compartment 41 is to be kept at an appreciably lower temperature. The compartments 40 and 41 contain cooling units 42 and 43 respectively. Each of the cooling units 42 and 43 are fed with refrigerant, from the refrigerant liquid conduit 44, by means of the thermostatically controlled expansion valves 45 and 46 respectively. The operation of these valves is well understood in the art and at present they are in universal use; therefore, it will suffice to point out that the function of these valves is to feed refrigerant, to a cooling unit, at such rate as will maintain a definite increase in temperature at the outlet of the cooling unit as compared to the temperature at the inlet of the cooling unit. Under the condition of temperature difference, just mentioned, the vapor, issuing from a cooling unit, will be in a superheated state.

If further information is desired regarding the method of operation of these valves, it may be obtained from any of the following patents: T. C. Whitehead, 1,662,289 issued March 13, 1928; H. E. Thompson, 1,747,958 issued Feb. 18, 1930; H. E. Thompson, 1,776,401 issued Sept. 23, 1930, and W. H. Bolton, 1,870,090 issued Aug. 2, 1932.

Both the thermal valves 45 and 46 have temperature bulbs 47 and 48 respectively, which are clamped to the outlets of their respective cooling units, thereby controlling the valves responsive to the cooling unit outlet temperatures.

The outlet 49 of the cooling unit 43 is connected to a check valve 50, see Figure 3, which allows a flow from the cooling unit 43 whenever its pressure exceeds that obtaining in the suction line 51. Under reverse conditions of pressure, no flow occurs.

Between the thermal valve 45 and the cooling unit 42 is placed a pressure operated bleeder valve 52, see Figure 1. Connecting the outlet 53, of the cooling unit 42, and the pressure operated bleeder valve 52 is a by pass conduit 54 having a throttle valve 55.

A pressure switch 20, see Figure 2, is connected to the suction line 51 by the conduit 26, and controls, by means of the circuits 24 and 25, the operation of the motor 56 connected to the compressor 57 which exhausts refrigerant vapor from the suction line 51 and compresses it into the condenser 58 where, the heat being extracted, the refrigerant vapor condenses into liquid form and is forced into the refrigerant liquid conduit 44.

In order to give a clear explanation of the operation of the system, we shall make the following assumptions.

Methyl chloride to be used as the refrigerant.

The thermal valves 45 and 46 being adjusted to maintain a 10° F. temperature difference between the inlet and outlet of the cooling units, the higher temperature being at the outlet, as previously explained.

Compartment 40 to be maintained between 35° F. and 38° F. temperatures.

Compartment 41 to be maintained between 5° F. and 8° F. temperatures.

The cooling units of such capacity as to produce the desired compartment temperatures at 20° F. temperature difference between the refrigerant and compartment temperatures at the end of their on-time cycles. Under this condition, the cooling unit 42 will have a temperature of 15° F., and a refrigerant pressure of 25.86 lbs. abs., when the compartment 40 is at 35° F. temperature. The cooling unit 43 will have a temperature of —15° F. and a refrigerant pressure of 13.25 lbs. abs., when the compartment 41 is at 5° F. temperature.

Under the above conditions, we shall adjust the pressure controlled make and break circuit switch 20 to break contact and close down the compressor 57 whenever the pressure in the suction line 51 drops to 13.25 lbs. abs. and to make contact and start the compressor 57 at approximately 40 lbs. abs. pressure in the suction line 51. The pressure operated bleeder valve 52 is adjusted by means of the screw 7 so that whenever the pressure in the chamber 19 and cooling unit 42 reaches approximately 25.86 lbs. abs., the spring 8 forces the bellows 10 and valve 12 downwardly against the pressure in the chamber 19 plus the pressure of the spring 15.

Assuming the pressure in the suction line 51 to rise to 40 lbs. abs., then the pressure switch 20 establishes the circuit starting the motor 56 and compressor 57, which starts the circulation of refrigerant in the cooling unit 42. The thermal valve 45 regulates the rate of refrigerant feed so that the outlet 53, at all times during the circulation, will be at a 10° F. temperature increase above that of the temperature at the cooling unit inlet.

As the temperature of the compartment 40 drops, the temperature and pressure of the cooling unit 42 also drops, but the 10° F. temperature difference between the inlet and outlet of the cooling unit 42 is maintained by the thermal valve 45 and its temperature bulb 47.

Whenever the pressure and temperature, of the cooling unit 42, reach a value of 25.86 lbs. abs. and 15° F. respectively, the compartment 40 will be at a temperature of 35° F., and the bleeder valve 52 will open, allowing liquid refrigerant from the chamber 19 to flow through the by-pass conduit 54, the mixture, of superheated vapor passing from the cooling unit 42 and the refrigerant liquid passing through the by-pass 54, produces a decreased condition of superheat at the outlet 53, which by a decrease in temperature of the temperature bulb 47 results in the valve 45 decreasing the rate of refrigerant flow, which in turn decreases the refrigerant pressure in the cooling unit 42 and suction line 51, resulting in the bleeder valve 52 opening further and further, thereby allowing a greater flow through the by-pass 54. Since the temperature bulb 47 regulates the rate of refrigerant feed through the thermal valve 45 to, under all conditions of circulation, maintain a 10° F. temperature difference, it can only be logical that, whenever the bleeder valve 52 is fully open, there can be only the very slightest trickle of refrigerant through the thermal valve 45 in order to maintain the temperature difference. Since no refrigerant enters the cooling unit 42 during the opening of the bleeder valve 52, the refrigerant is rapidly evacuated and the cooling unit 42 is in condition to readily defrost the moisture accumulated during the circulation of the refrigerant. This defrosting being as readily accomplished whether the compressor is on either the on or off-time cycles.

When the suction line 51 is evacuated to approximately 22 lbs. abs. which corresponds to 8° F., to which temperature the compartment 41 is supposed to be at this time, the check valve 50 opens, since the pressure in the cooling unit 43 is at or slightly above 22 lbs. abs.

When the temperature of the cooling unit 43 reaches —15° F., the temperature of the compartment will be 5° F. At this time the pressure in the suction line 51 will be 13.25 lbs. abs., and the pressure switch 20 will break the circuit stopping the motor 56 and the compressor 57.

During the off-time cycle, the bleeder valve 52, the by-pass conduit 54 and the outlet 53 rise in temperature, above the —15° F. temperature they had at the finish of the on-time cycle. This increase in temperature results in an increased pressure. Whenever the pressure exceeds 25.86 lbs., the bleeder valve 52 closes. Whenever the pressure reaches approximately 40 lbs. abs., the system again starts the on-time cycle of the compressor.

During the operation of the system, as described above, the throttle valve 55, in the by-pass 54, is presumed to be substantially in its open position.

Since the temperature bulb 47 tends to maintain a 10° F. increased temperature, at the outlet 53 of the cooling unit 42, over that of the temperature of the cooling unit inlet and further, since the temperature of the outlet 53 may be varied by introducing graduated amounts of unvaporized refrigerant liquid into the superheated vapor stream issuing from the cooling unit, such introduction of liquid taking place prior to the passage through the outlet 53 upon which the temperature bulb 47 is clamped, as shown, it follows that, with the proper regulation of the throttle valve 55, it is then possible to regulate the effective capacity of the cooling unit 42, even during the opening of the bleeder valve 52, to such a point as to maintain a steady temperature in the compartment 40, while effective refrigeration is being performed in the compartment 41.

While the above is a preferred embodiment of the invention, it is understood that variations, in the details thereof, may be employed to accomplish the same results, without departing from the spirit and scope of the invention.

I claim:

1. The combination of a cooling unit for the circulation of a refrigerant fluid, control means responsive to the thermal condition of the refrigerant passing from the cooling unit and regulating the refrigerant feed to the cooling unit in accordance therewith, means to vary the normal thermal conditions of the refrigerant passing from the cooling unit and thereby additionally controlling the control means, the varying means comprising an introduction of refrigerant fluid, having a different thermal condition, into the refrigerant fluid passing from the cooling unit and the said varying means being directly responsive to the pressure of the refrigerant fluid within the cooling unit.

2. The combination of a cooling unit for the circulation of a refrigerant fluid, control means responsive to the thermal condition of the refrigerant passing from the cooling unit and regulating the refrigerant feed to the cooling unit in accordance therewith, means to vary the normal thermal condition of the refrigerant passing from the cooling unit and thereby additionally controlling the control means, the varying means comprising a bypassing of refrigerant from the inlet to the outlet of the cooling unit, and the said varying means being directly responsive to the pressure of the refrigerant fluid within the cooling unit.

3. In a refrigerating system, the combination of a plurality of cooling units having a common outlet conduit, a refrigerant fluid circulating means connected to said outlet conduit and cyclically operated between certain pressure limits in said outlet conduit, a check valve in the outlet of one of the cooling units and allowing only a one way passage of refrigerant fluid from the said cooling unit, automatic bypass means connected to another of the said cooling units and bypassing refrigerant from the inlet to the outlet of the cooling unit responsive to the temperature of the cooling unit.

4. In a refrigerating system, the combination of a thermostatically controlled expansion valve feeding refrigerant to a cooling unit in response to the condition of superheat of the vapor generated in the cooling unit, and vapor pressure responsive means tending to decrease the superheat of the generated vapor.

5. In a refrigerating system, the combination of a thermostatically controlled expansion valve feeding refrigerant to a cooling unit in response to the condition of superheat of the vapor generated in the cooling unit, and mean, directly responsive to the pressure conditions within the cooling unit, tending to decrease the superheat of the generated vapor, the superheat decreasing means becoming operative at a certain low pressure of the refrigerant within the cooling unit.

6. In a refrigerating system, the combination of a thermostatically controlled expansion valve feeding refrigerant to a cooling unit in response to the condition of superheat of the vapor generated in the cooling unit, and means, directly responsive to the pressure conditions within the cooling unit, tending to decrease the superheat of the generated vapor, the superheat decreasing means becoming operative at a certain low pressure of the refrigerant within the cooling unit, the said superheat decreasing means being adjustable.

ANTHONY F. HOESEL.